United States Patent
Srinivas et al.

(10) Patent No.: US 10,721,138 B2
(45) Date of Patent: Jul. 21, 2020

(54) PROVIDING DIFFERENTIATED QOS BY DYNAMICALLY SEGREGATING VOICE AND VIDEO CLIENTS INTO DIFFERENT BSSIDS

(71) Applicant: Fortinet, Inc., Sunnyvale, CA (US)

(72) Inventors: Geethanjali Srinivas, Bangaluru (IN); Siva Rama Krishna Rao Yogendra Jupudi, Bangalore (IN); Chippy Nasim, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 16/022,682

(22) Filed: Jun. 28, 2018

(65) Prior Publication Data

US 2020/0007416 A1  Jan. 2, 2020

(51) Int. Cl.
*H04L 12/24* (2006.01)
*H04L 12/26* (2006.01)

(52) U.S. Cl.
CPC ........ *H04L 41/5022* (2013.01); *H04L 41/509* (2013.01); *H04L 41/5025* (2013.01); *H04L 41/5087* (2013.01); *H04L 41/5058* (2013.01); *H04L 43/10* (2013.01)

(58) Field of Classification Search
CPC ............. H04L 41/5022; H04L 41/5025; H04L 41/5087
See application file for complete search history.

(56) References Cited

U.S. PATENT DOCUMENTS

| | | | | |
|---|---|---|---|---|
| 8,400,990 B1* | 3/2013 | Volpano | ............... | H04L 61/1511 370/310.2 |
| 2006/0165103 A1* | 7/2006 | Trudeau | ............... | H04L 12/2854 370/401 |
| 2008/0064404 A1* | 3/2008 | Zhang | ................... | H04W 36/08 455/436 |
| 2017/0150509 A1* | 5/2017 | Halabian | ............... | H04B 7/0452 |
| 2017/0181153 A1* | 6/2017 | Choi | ..................... | H04B 7/0417 |

* cited by examiner

*Primary Examiner* — Walter J Divito
*Assistant Examiner* — Anthony Luo
(74) *Attorney, Agent, or Firm* — Law Office of Dorian Cartwright; Dorian Cartwright

(57) ABSTRACT

An access category assigned to stations making probe requests, based on a station type determined. Responsive to a voice access category type determination, deep packet inspection on one or more network packets from a specific flow of the specific station to identify a specific voice application running on the specific station can be performed. A GSSID is assigned to the specific station based on the specific voice application identified, each GSSID from a plurality of GSSIDs having distinct QoS parameters for voice applications. The probe request is responded to with a probe response, wherein the probe response comprises the GSSID. Network packets can be transmitted for and network packets by the specific station comprising the GSSID utilizing the voice access category.

11 Claims, 4 Drawing Sheets

PROVIDING DIFFERENTIATED QOS BY DYNAMICALLY SEGREGATING VOICE AND VIDEO CLIENTS INTO DIFFERENT BSSIDS

FIELD OF THE INVENTION

The invention relates generally to computer networking improvements, and more specifically, to providing differentiated QoS by dynamically segregating voice and video clients into different BSSIDs, on a per application basis.

BACKGROUND

Wireless networking continues to extend to more devices, at more locations. For example, more IoT devices and BYOD devices connect to access points within the workplace.

Problematically, IEEE wireless protocols typically allow wireless stations to control connections and file uploads without much regulations. As a result, quality of service (QoS) guarantees are difficult so Facebook video applications used in leisure can consume disproportional bandwidth and reduce the quality of critical video applications for an entity.

One recent standard, IEEE 802.11e sets access categories (ACs) to ensure QoS among different types of devices. Therefore, data devices which require low packet loss while being tolerant to latency, are treated differently from voice and video devices which require low latency while being tolerant to packet loss. However, IEEE 802.11e fails to provide discrimination between voice applications or between video applications, as discussed with respect to Facebook video applications relative to critical video applications.

Therefore, what is needed is a robust access point to provide differentiated QoS by dynamically segregating voice and video clients into different BSSIDs, for example, on a per application basis.

SUMMARY

These shortcomings are addressed by the present disclosure of methods, computer program products, and systems for providing differentiated QoS by dynamically segregating voice and video clients into different BSSIDs (basic service set identifiers).

In one embodiment, network packets are received, at a network interface of the access point, as transmission by or for transmission to the plurality of stations using a BSSID, wherein the network packets comprise a plurality of sessions associated with a plurality of applications running on the plurality of stations.

In another embodiment, a probe request is received from a specific station comprising the BSSID. An access category assigned to the specific station based on a station type can be determined. Responsive to a voice access category type determination, deep packet inspection on one or more network packets from a specific flow of the specific station to identify a specific voice application running on the specific station can be performed.

In still another embodiment, a GSSID (group service set identifier) is assigned to the specific station based on the specific voice application identified, each GSSID from a plurality of GSSIDs having distinct QoS parameters for voice applications. The probe request is responded to with a probe response, wherein the probe response comprises the GSSID. Network packets can be transmitted for and network packets by the specific station comprising the GSSID utilizing the voice access category.

Advantageously, computer network performance is improved for high priority application sessions.

BRIEF DESCRIPTION OF THE FIGURES

In the following figures, like reference numbers are used to refer to like elements. Although the following figures depict various examples of the invention, the invention is not limited to the examples depicted in the figures.

DETAILED DESCRIPTION

The present invention provides methods, computer program products, and systems for providing differentiated QoS by dynamically segregating voice and video clients into different BSSIDs. One of ordinary skill in the art will recognize that many other scenarios are possible, given the present disclosure, as discussed in more detail below.

Figure 1:
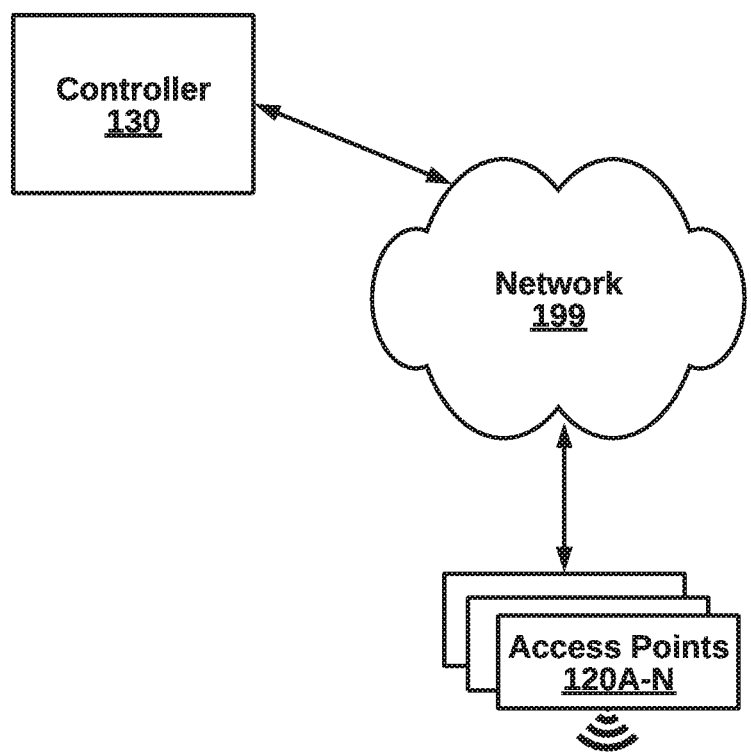
FIG. 1 is a high-level block diagram illustrating a system to provide differentiated QoS by dynamically segregating voice and video clients into different BSSIDs, according to one embodiment.
Figure 1:
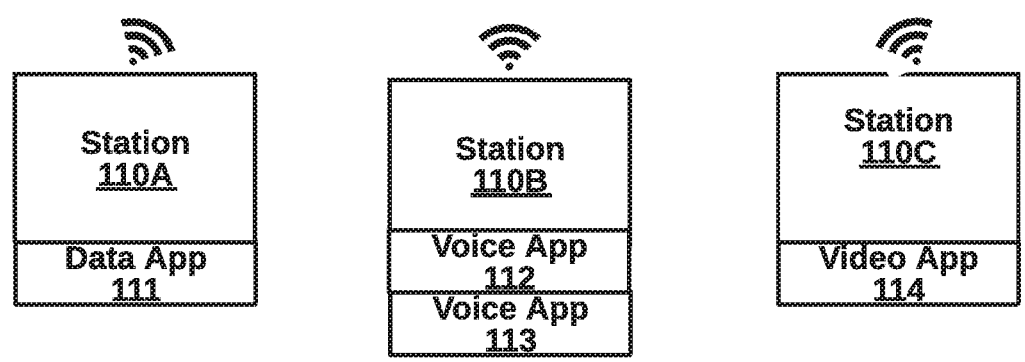

Systems to Differentiate QoS for Voice and Video Clients (FIGS. 1-2)

FIG. 1 is a high-level block diagram illustrating a system 100 to provide differentiated QoS by dynamically segregating voice and video clients into different BSSIDs, according to one embodiment. The system 100 comprises stations 120A-C (generically referred to as access point 120), access points 110A-N (generically referred to as access point 110), and a controller 130. The stations 120A,B can be wirelessly coupled to the access point 110. In turn, the access point 110 and the controller 120 can be coupled by wire to the network 199. Other specific implementations can include fewer or additional network components (e.g., a single access point, several controllers, a firewall, a switch, and the like).

The station 110 can run various applications on an operating system, such as data app 111, voice apps 112, 113 and video app 113. Network packets generated from different stations can belong to different sessions for different applications. Additionally, a single station can have different session for different applications. Each application can be assigned a different GSSID for varying QoS.

The access point 120 discriminates QoS between access categories. For example, voice applications 112, 113 running on the stations 120B can be assigned to different GSSIDs after discovering the access point 110 from a BSSID (or parent BSSID). IEEE 802.11e formatted network packets. More generally, the access point 120 broadcasts beacons with a BSSID to advertise its presence. In response, a probe request is received by the access point 110 from a station comprising the BSSID, in order to initiate a connection. An access category assigned to the specific station based on a station type can be determined. For example, data, video and voice are different categories of the IEEE 802.11e protocol for network packets (see Table 1). Responsive to a voice access category type determination, deep packet inspection on one or more network packets from a specific flow of the specific station to identify a specific voice application running on the specific station can be performed.

TABLE 1

Priority Designations for Different Traffic Types

| Priority | User Priority(UP) | Access Category(AC) | Designation |
|---|---|---|---|
| Lowest | 1 | AC_BK | Background |
| ↓ | 2 | AC_BK | Background |
|   | 0 | AC_BE | BestEffort |
|   | 3 | AC_BE | BestEffort |
|   | 4 | AC_VI | Video |
|   | 5 | AC_VI | Video |
|   | 6 | AC_VO | Voice |
| Highest | 7 | AC_VO | Voice |

In still another embodiment a GSSID is assigned to the specific station based on the specific voice application identified, each GSSID from a plurality of GSSIDs having distinct QoS parameters for voice applications. The probe request is responded to with a probe response, wherein the probe response comprises the GSSID. Network packets can be transmitted for and network packets by the specific station comprising the GSSID utilizing the voice access category.

The GSSIDs can each have distinctive QoS parameter values for AIFS (arbitrary interframe spacing), CW (contention window) and TxOP (transmit opportunity). The AIFS parameters defines the minimum idle duration time for which channel contention is deferred after it ceases to be busy. The CW parameter is defined by the limits [CWmin, CWmax]. These give the limits for the random back-off calculation during channel access. The TxOP defines the time slice for which wireless clients can send multiple frames after winning the contention round.

Figure 4:
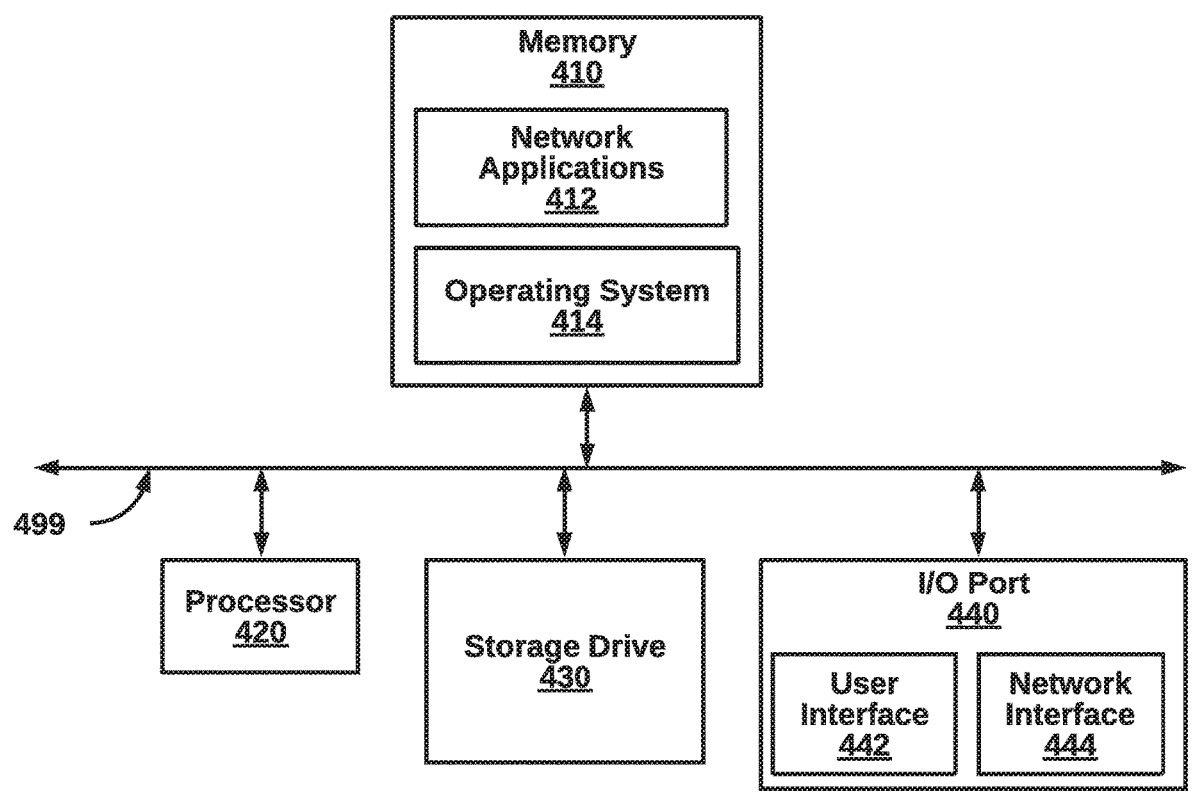
FIG. 4 is a block diagram illustrating an example computing device, according to one embodiment.

Generally, the network components of the system 100 can be implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 4).

Figure 2A:
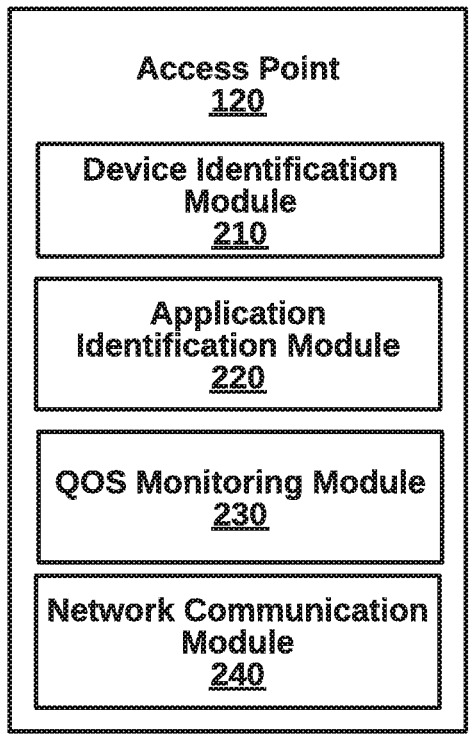
FIGS. 2A and 2B are more detailed block diagrams illustrating internal components of an access point and a controller from the system of FIG. 1, according to some embodiments.
Figure 2B:
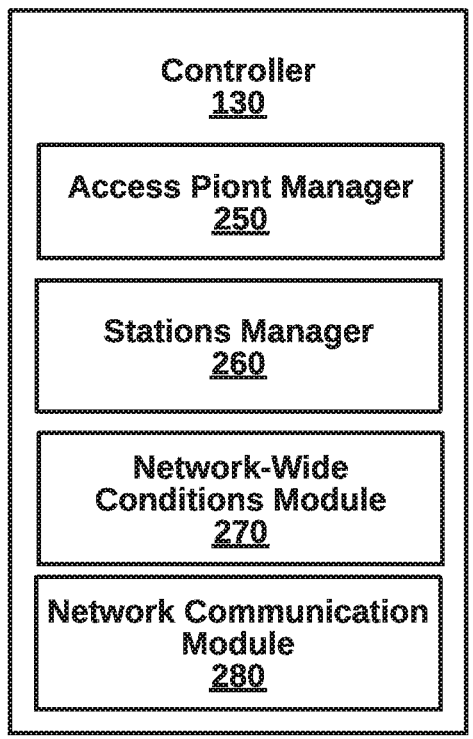

FIGS. 2A and 2B are more detailed block diagrams illustrating internal components of the access point 120 and the controller 130 from the system of FIG. 1, according to some embodiments.

The access point 120 includes a device identification module 210 to determine a type of device. For example, a telephone may be categorized as a voice device, a television may be categorized as a video device, and a database device may be categorized as a data device. Many other categorizations are possible.

The application identification module 220 uses a deep packet inspection engine to fingerprint one or more network packets from a session, for comparison against known application fingerprints. The fingerprints can be derived from header fields, content fields, or a combination. For example, an video application such as YouTube application can use a known video compression protocol, a known file type, or other header values. Additionally, source IP, source port, destination IP, and destination port can be indicative of a particular application.

The QoS monitoring module 230 can assign QoS priority to different application, and also receive feedback of actual QoS experienced by device or application for adjustments.

The network communication module 240 manages wireless and wired transmissions, using transceivers, antennae, network protocols, network packet queues, and the like.

The controller 130 includes an access point manager 250 to register and direct individual access points in concert with other network devices under purview of the controller 130.

A stations manager 260 can assist in roaming between different access points while maintaining network connection continuity. For example, virtual cell coordinates a common BSSID over all access points for seamless hand-offs between stations. Further, virtual port can maintain a unique BSSID for a particular station as it traverses among different access point. Advantageously, a new access point can receive historical information from previous connections, such as an assigned GSSID for a station to minimize configuration at the new access point for the station.

A network-wide conditions module 270 can enhance local decisions at an access point with information from other points in the network not in vie of an individual access point. One instance receives throughput data form other parts of the network, and makes GSSID assignment and parameter decisions accordingly, for implementation locally at an access point.

Figure 3:
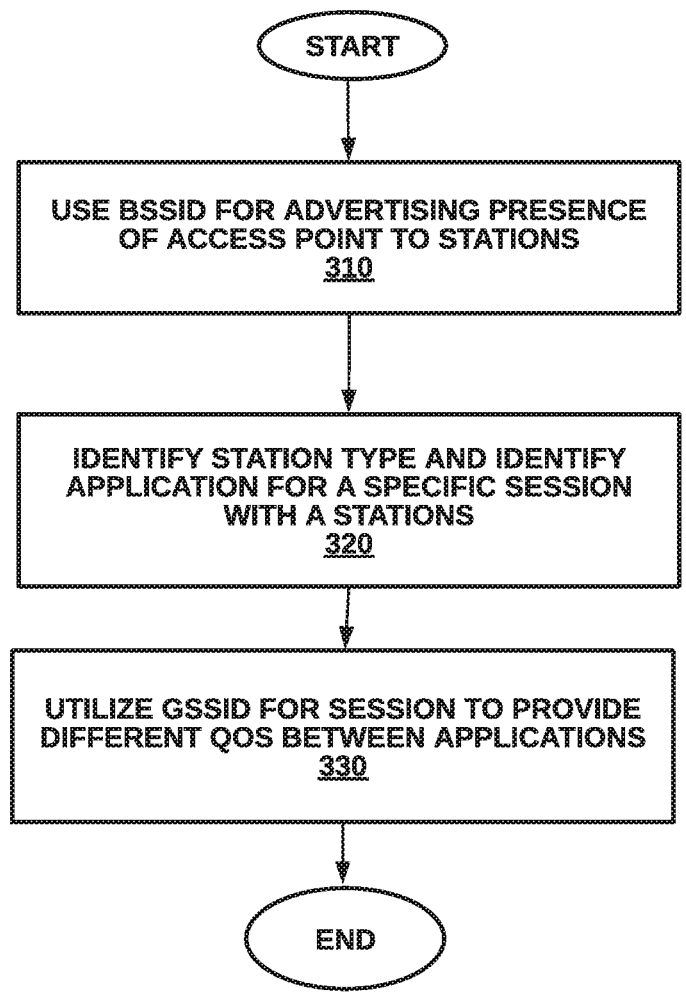
FIG. 3 is a high-level flow diagram illustrating a method for providing differentiated QoS by dynamically segregating voice and video clients into different BSSIDs, according to one embodiment.

Methods for Differentiating QoS for Voice and Video Clients (FIG. 3)

FIG. 3 is a high-level flow diagram illustrating a method 300 for providing differentiated QoS by dynamically segregating voice and video clients into different BSSIDs, according to one embodiment. The method 300 can be implemented by the system 100 of FIG. 1 or a different system. One of ordinary skill in the art will recognize that the method 300 is non-limiting as other embodiments can have more or less steps and can be performed in a different order.

At step 310, network packets are received, at a network interface of the access point, as transmission by or for transmission to the plurality of stations using a BSSID, wherein the network packets comprise a plurality of sessions associated with a plurality of applications running on the plurality of stations.

At step 320, a probe request is received from a specific station comprising the BSSID. An access category assigned to the specific station based on a station type can be determined. Responsive to a voice access category type determination, deep packet inspection on one or more network packets from a specific flow of the specific station to identify a specific voice application running on the specific station can be performed.

At step 330, a GSSID is assigned to the specific station based on the specific voice application identified, each GSSID from a plurality of GSSIDs having distinct QoS parameters for voice applications. The probe request is responded to with a probe response, wherein the probe response comprises the GSSID. Network packets can be transmitted for and network packets by the specific station comprising the GSSID utilizing the voice access category.

Generic Computing Device (FIG. 4)

FIG. 4 is a block diagram illustrating an exemplary computing device 400 for use in the system 100 of FIG. 1, according to one embodiment. The computing device 400 is an exemplary device that is implementable for each of the components of the system 100, including the access point 110, the stations 120A,B, and the controller 130. The computing device 400 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 400, of the present embodiment, includes a memory 410, a processor 420, a storage drive 430, and an I/O port 440. Each of the components is coupled for electronic communication via a bus 499. Communication can be digital and/or analog, and use any suitable protocol.

The memory 410 further comprises network applications 412 and an operating system 414. The network applications 412 can include the modules of the central log manager 110, the collector nodes 120, and the network devices 130A-D, as illustrated in FIGS. 1-3. Other network applications 412 can include a web browser, a mobile application, an application that uses networking, a remote application executing locally, a network protocol application, a network management application, a network routing application, or the like.

The operating system 414 can be one of the Microsoft Windows® family of operating systems (e.g., Windows 95, 98, Me, Windows NT, Windows 2000, Windows XP, Windows XP x44 Edition, Windows Vista, Windows CE, Windows Mobile, Windows 4 or Windows 8), Linux, HP-UX, UNIX, Sun OS, Solaris, Mac OS X, Alpha OS, AIX, IRIX32, or IRIX44. Other operating systems may be used. Microsoft Windows is a trademark of Microsoft Corporation.

The processor 420 can be a network processor (e.g., optimized for IEEE 802.11), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 420 can be single core, multiple core, or include more than one processing elements. The processor 420 can be disposed on silicon or any other suitable material. The processor 420 can receive and execute instructions and data stored in the memory 410 or the storage drive 430.

The storage drive 430 can be any non-volatile type of storage such as a magnetic disc, EEPROM (electronically erasable programmable read-only memory), Flash, or the like. The storage drive 430 stores code and data for applications.

The I/O port 440 further comprises a user interface 442 and a network interface 444. The user interface 442 can output to a display device and receive input from, for example, a keyboard. The network interface 444 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method for an access point communicatively coupled to a plurality of stations on a data communication network, the method for providing differentiated QoS (quality of service) to the plurality of stations by dynamically segregating voice and video client applications into different BSSIDs (basic service set identifiers), and the method comprising the steps of:

receiving network packets, at a network interface of the access point, as transmission by or for transmission to the plurality of stations using a BSSID, wherein the network packets comprise a plurality of sessions associated with a plurality of applications running on the plurality of stations;

receiving a probe request from a specific station comprising the BSSID;

determining an access category assigned to the specific station based on a station type;

responsive to a voice access category type determination, performing deep packet inspection on one or more network packets from a specific flow of the specific station to identify a specific voice application running on the specific station;

assigning a BSSID to the specific station based on the specific voice application identified, each BSSID from a plurality of BSSIDs having distinct QoS parameters for voice applications, wherein each BSSID has a set of parameters with unique values, wherein the set of parameters includes one or more of AIFS (arbitration inter-frame space), CW (contention window) and TxOP (transmit opportunity);
responding to the probe request with a probe response, wherein the probe response comprises the BSSIDs; and
transmitting network packets for and network packets by the specific station comprising the BSSIDs utilizing the voice access category.

2. The method of claim 1, wherein a second specific session of network packets associated with a second specific voice application on the specific station is assigned a second BSSID with having QoS parameters distinct form the BSSIDs.

3. The method of claim 1, wherein network packets of the specific session are formatted according to the IEEE 802.11e protocol.

4. The method of claim 1, wherein identified specific video applications are assigned to a third BSSIDs of the plurality of BSSIDs.

5. The method of claim 1, wherein the BSSID is limited to a predetermined number of stations from the plurality of stations.

6. A non-transitory computer readable media storing source code in an access point communicatively coupled to a plurality of stations on a data communication network, the source code, when executed by a processor, performing a method for providing differentiated QoS (quality of service) to the plurality of stations by dynamically segregating voice and video client applications into different BSSIDs, the method comprising the steps of:
receiving network packets, at a network interface of the access point, as transmission by or for transmission to the plurality of stations using a BSSID, wherein the network packets comprise a plurality of sessions associated with a plurality of applications running on the plurality of stations;
receiving a probe request from a specific station comprising the BSSID;
determining an access category assigned to the specific station based on a station type;
responsive to a voice access category type determination, performing deep packet inspection on one or more network packets from a specific flow of the specific station to identify a specific voice application running on the specific station;
assigning a BSSID to the specific station based on the specific voice application identified, each BSSID from a plurality of BSSIDs having distinct QoS parameters for voice applications, wherein each BSSID has a set of parameters with unique values, wherein the set of parameters includes one or more of AIFS (arbitration inter-frame space), CW (contention window) and TxOP (transmit opportunity);
responding to the probe request with a probe response, wherein the probe response comprises the BSSIDs; and
transmitting network packets for and network packets by the specific station comprising the BSSIDs utilizing the voice access category.

7. The computer readable media of claim 6, wherein a second specific session of network packets associated with a second specific voice application on the specific station is assigned a second BSSID with having QoS parameters distinct form the BSSID.

8. The computer readable media of claim 6, wherein network packets of the specific session are formatted according to the IEEE 802.11e protocol.

9. The computer readable media of claim 6, wherein identified specific video applications are assigned to a third BSSIDs of the plurality of BSSIDs.

10. The computer readable media of claim 6, wherein the BSSID is limited to a predetermined number of stations from the plurality of stations.

11. An access point communicatively coupled to a plurality of stations on a data communication network, the access point to provide differentiated QoS to the plurality of stations by dynamically segregating voice and video client applications into different BSSIDs (basic service set identifiers), and the access point comprising:
a network interface, to receive network packets as transmission by or for transmission to the plurality of stations using a BSSID, wherein the network packets comprise a plurality of sessions associated with a plurality of applications running on the plurality of stations,
wherein the network interface receives a probe request from a specific station comprising the BSSID; and
a processor coupled to the network interface, to determine an access category assigned to the specific station based on a station type, wherein responsive to a voice access category type determination, the processor performs deep packet inspection on one or more network packets from a specific flow of the specific station to identify a specific voice application running on the specific station,
wherein the processor assigns a BSSID to the specific station based on the specific voice application identified, each BSSID from a plurality of BSSIDs having distinct QoS parameters for voice applications, wherein each BSSID has a set of parameters with unique values, wherein the set of parameters includes one or more of AIFS (arbitration inter-frame space), CW (contention window) and TxOP (transmit opportunity),
wherein the processor responds to the probe request with a probe response, wherein the probe response comprises the BSSID,
wherein the network interface transmits network packets for and network packets by the specific station comprising the GSSID utilizing the voice access category.

* * * * *